United States Patent
Hashimoto et al.

(10) Patent No.: US 9,692,281 B2
(45) Date of Patent: Jun. 27, 2017

(54) METHOD FOR PRODUCING ROTOR LAMINATED CORE

(71) Applicant: MITSUI HIGH-TEC, INC., Kitakyushu-shi, Fukuoka (JP)

(72) Inventors: Akihiro Hashimoto, Fukuoka (JP); Takahiro Shimizu, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 525 days.

(21) Appl. No.: 14/178,767

(22) Filed: Feb. 12, 2014

(65) Prior Publication Data
US 2014/0230236 A1    Aug. 21, 2014

(30) Foreign Application Priority Data
Feb. 19, 2013 (JP) ................ 2013-030108

(51) Int. Cl.
*H02K 15/02* (2006.01)
*H02K 1/27* (2006.01)
*H02K 15/03* (2006.01)

(52) U.S. Cl.
CPC ......... *H02K 15/024* (2013.01); *H02K 1/2773* (2013.01); *H02K 15/03* (2013.01); *Y10T 29/49012* (2015.01)

(58) Field of Classification Search
CPC ......... Y10T 29/49012; Y10T 29/49009; Y10T 29/49002; Y10T 29/49; H02K 15/024; H02K 15/02; H02K 1/2773; H02K 1/27
USPC .............. 29/598, 596, 592.1, 592
See application file for complete search history.

(56) References Cited

U.S. PATENT DOCUMENTS
2014/0230236 A1* 8/2014 Hashimoto .......... H02K 1/2773
29/598

FOREIGN PATENT DOCUMENTS
JP          09-289745       11/1997

* cited by examiner

*Primary Examiner* — Peter DungBa Vo
*Assistant Examiner* — Azm Parvez
(74) *Attorney, Agent, or Firm* — Greenblum & Bernstein, P.L.C.

(57) ABSTRACT

There is provided a method for producing a rotor laminated core by laminating circular core pieces. The method determines a first blanking area, a second blanking area and a third blanking area in the magnetic steel board, wherein the first blanking area defines a shape of the core piece, the second blanking area defines a shape of a magnet-insertion hole, and the third blanking area defines a shape of an arbitrary part in the magnetic steel board. The method also forms a temporary aperture in the second blanking area, forms a thinning part which extends from the temporary aperture to the third blanking area, and blanks the first blanking area, the second blanking area and the third blanking area, thereby producing each circular core piece including the thinning part and magnet-insertion holes formed in a circumferential direction.

10 Claims, 9 Drawing Sheets

FIG.9D

METHOD FOR PRODUCING ROTOR LAMINATED CORE

CROSS REFERENCE TO RELATED APPLICATIONS

The present application is based upon and claims the benefit of Japanese patent application No. 2013-030108 filed on Feb. 19, 2013, the contents of which are incorporated by reference in its entirety.

BACKGROUND OF THE INVENTION

1. Field of the Invention

The present invention relates to a method for producing a rotor laminated core in which permanent magnets are provided in magnet-insertion holes, and particularly relates to a method for producing the rotor laminated core that reduces magnetic flux loss.

2. Description of the Related Art

In recent years, an electric motor which uses permanent magnets for a rotor is used for a hybrid car, an electric car, an air-conditioner, and the like. The permanent magnets are inserted in a plurality of magnet-insertion holes formed along the circumference of the rotor laminated core. However, since it is general that the magnet-insertion hole only has a space slightly larger than the shape of the eternal magnet which is inserted in the magnet-insertion hole, leakage flux which passes the laminated core in magnetic flux directing from the N pole to the S pole of the permanent magnet may be generated.

Figure 8A:
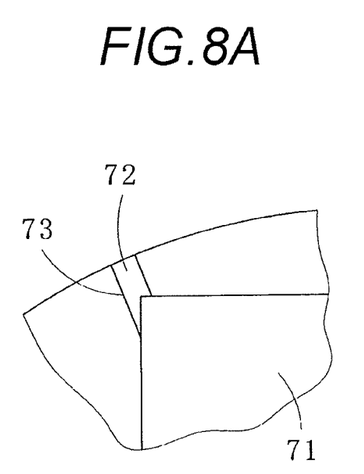
FIGS. 8A and 8B are illustrations indicating a structure of a thinning part of a rotor laminated core according to a related art.
Figure 8B:
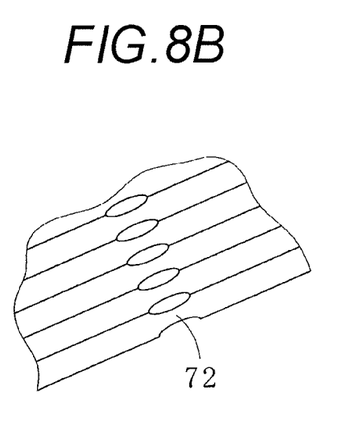

Thus, as described in JP-A-9-289745, it is proposed that a groove-shaped hardened part is provided by compression transformation in a bridge part in which the magnetic flux is leaked out from the N pole to the S pole of the permanent magnet in a lateral side of the permanent magnet. It is described that the leakage flux decreases, and the strength of the laminated core is improved by providing the hardened part. These aspects are shown in a plan view of FIG. 8A and a side view of FIG. 8B. FIG. 8A and FIG. 8B illustrate a magnet-insertion hole 71, a hardened part (thinning part) 72 and a bridge part (an area A through which leakage flux passes) 73.

Figure 9A:
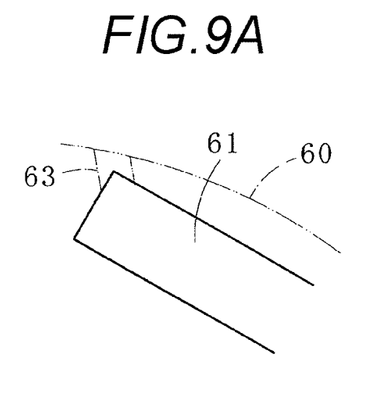
FIGS. 9A to 9D are illustrations indicating the structure of the thinning part of the rotor laminated core according to the related art.
Figure 9B:
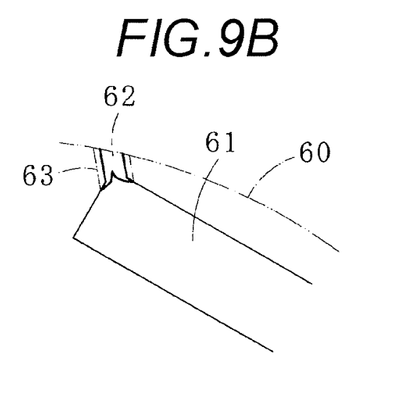
Figure 9C:
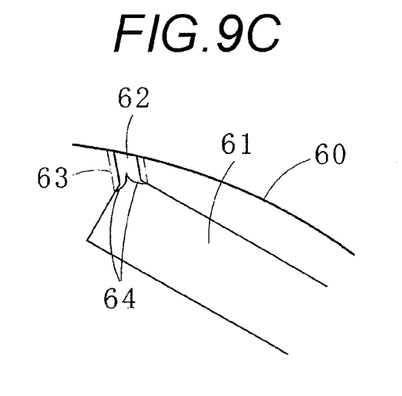

The method for producing a rotor laminated core in this case is described referring to FIGS. 9A to 9D. In a core piece 60 which constitute a part of the rotor laminated core, as shown in FIG. 9A, a plurality of magnet-insertion holes 61 arranged along a circumferential direction are formed at an outside area in a radial direction of the core piece 60. Then, a coining process is performed to form a thinning part 62 as shown in FIG. 9B, and an outer shape of the core piece 60 is punched as shown in FIG. 9C, thereby forming each core piece 60. In FIGS. 9B and 9C, a bridge part 63 is shown.

SUMMARY OF THE INVENTION

Figure 9D:
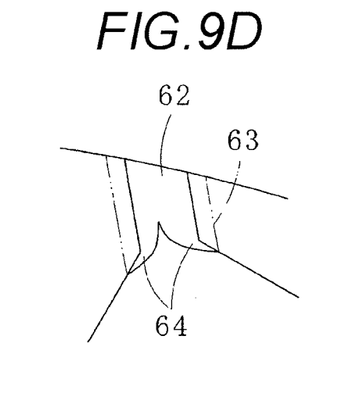

However, as shown in an enlarged view of FIG. 9D, pieces (metal pieces) of the coined part is extruded to the outer side of the core piece 60 and to the magnet-insertion hole 61 of the core piece 60 in a step of FIG. 9B. The metal pieces extruded to the outer side of the core piece 60 does not affect on the shape of the core piece 60 because the metal pieces are removed in the process of outer blanking. On the other hand, the metal pieces extruded to the side of the magnet-insertion hole 61 remain in the magnet-insertion hole as a protruded part 64. In this case, the accuracy of the shape of the magnet-insertion hole 61 is lowered, and therefore, the leakage flux is generated and the magnetic property is deteriorated in some cases.

In consideration with the circumstance as mentioned above, an object of the present invention is to provide a method for producing a rotor laminated core by which a metal is hardly protruded into a magnet-insertion hole and the accuracy in shape of the magnet-insertion hole and the magnetic property of the eternal magnet are hardly deteriorated even if a thinning part is provided by coining process.

A first aspect of the present invention provides a method for producing a rotor laminated core by laminating circular core pieces, the method including: preparing a magnetic steel board from which each of the circular core pieces is blanked; determining a first blanking area, a second blanking area and a third blanking area in the magnetic steel board, wherein the first blanking area defines a shape of each core piece in the magnetic steel board, the second blanking area defines a shape of a magnet-insertion hole to be formed in each core piece to insert a permanent magnet therein, and the third blanking area defines a shape of an arbitrary part in the magnetic steel board; forming a temporary aperture in the second blanking area; forming a thinning part which extends at least from the temporary aperture to the third blanking area; and blanking the first blanking area, the second blanking area together with the temporary aperture and the third blanking area, thereby producing each circular core piece including the thinning part and a plurality of magnet-insertion holes which are formed in a circumferential direction.

In a second aspect of the present invention, the method may be configured so that the temporary aperture is formed with a gap from a boundary of the second blanking area, and the thinning part is formed in a groove-shape which extends from the temporary aperture to the third blanking area, and the thinning part crosses an area in the core piece through which a leakage flux is passed from the permanent magnet.

In a third aspect of the present invention, the method may be configured so that the temporary aperture is provided on an extension of the groove-shaped thinning part, and the temporary aperture is larger in width than the groove-shaped thinning part.

In a fourth aspect of the present invention, the method may be configured so that the temporary aperture is formed separate by an amount of 0.05 to 0.5 mm from a boundary of the second blanking area which contacts the thinning part.

In a fifth aspect of the present invention, the method may be configured so that the temporary aperture includes a first part which is continuous to the thinning part and an expanded part having a width smaller than that of the first part to extend an entire circumference of the temporary aperture.

In a sixth aspect of the present invention, the method may be configured so that the third blanking area is an area outside the first blanking area, another blanking area which defines a shape of another magnet-insertion hole in the core piece, or still another blanking area which defines a shape of an aperture for reduction in weight of the core piece.

In a seventh aspect of the present invention, the method may be configured so that a thickness of the thinning part is in a range of 0.3 to 0.98 times of a board thickness of the core piece.

According to the method for producing a rotor laminated core by laminating circular core pieces according to the first to seventh aspects of the present invention, it is possible to form a thinning part in an area (a bridge part) where a leakage flux from the permanent magnet passes while keeping the shape of the magnet-insertion hole in a regular state. Thereby, the area A can be hardened and the leakage flux of the area can be decreased.

Particularly, according to the production method in the third aspect of the present invention, the temporary aperture is provided on an extension of the thinning part, and the temporary aperture is larger in width than the groove-shaped thinning part. Thereby, a bulge generated by a coining process can be absorbed in the temporary aperture.

According to the production method in the fourth aspect of the present invention, because the temporary aperture is formed separate by an amount of 0.05 to 0.5 mm from a boundary of the second blanking area which contacts the thinning part, the magnet-insertion hole is easily formed. That is, if the gap between the temporary aperture and the magnet-insertion hole is less than 0.05 mm, there may be a case where a connection of the blanked piece of the magnet-insertion hole is transformed and broken, and the rise in blanked piece is generated. Also, if the gap between the temporary aperture and the magnet-insertion hole exceeds 0.5 mm, the length for coining processing gets longer more than required.

According to the production method in the fifth aspect of the present invention, because the temporary aperture includes a first part which is continuous to the thinning part and an expanded part having a width smaller than that of the first part to extend an entire circumference of the temporary aperture, the rise of the blanked piece is prevented. In addition, because the cross sectional area of the blade increases due to the existence of the expanded part, the life of the blade can be lengthened.

According to the production method in the sixth aspect of the present invention, because the third blanking area is an area outside the first blanking area, another blanking area which defines a shape of another magnet-insertion hole in the core piece, or still another blanking area which defines a shape of an aperture for reduction in weight of the core piece, the accuracy in shape of the both ends of the thinning part in the longitudinal direction is enhanced.

DETAILED DESCRIPTION OF THE EXEMPLARY EMBODIMENTS

Hereinafter, a description is made of embodiments of the present invention referring to attached drawings.

As shown in FIGS. 1 to 3B, a production method of a rotor laminated core according to a first embodiment of the present invention concerns about a rotor laminated core 13 which is formed by laminating core pieces 10 and the rotor laminated core 13 has a plurality of magnet-insertion holes 12 where permanent magnets 11 are inserted in a circumferential direction of the rotor laminated core 13. The production method also forms a thinning part 14 which crosses an area A where leakage flux passes from the permanent magnet 11. An axial bore 15 is formed in a center of the rotor laminated core 13. In addition, a plurality of blanked apertures for weight reduction, not to be illustrated, may be formed.

Figure 1:
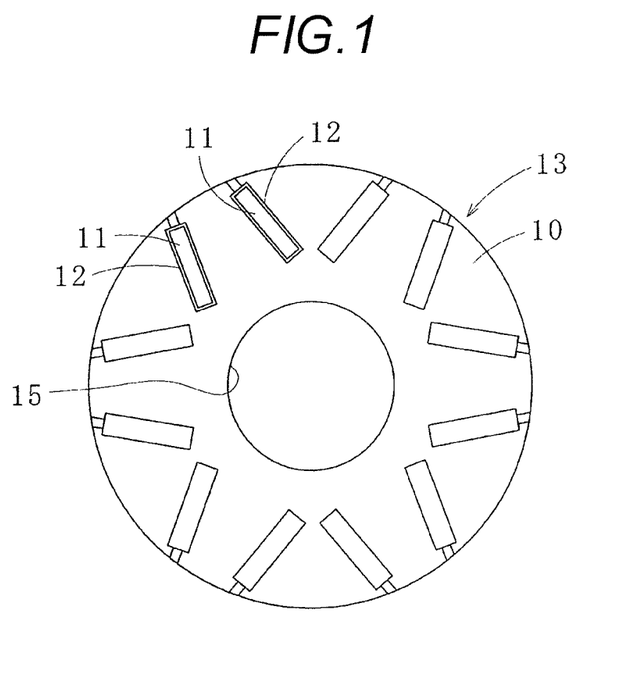
FIG. 1 is a plan view of rotor laminated core produced by a production method of the rotor laminated core according to a first embodiment of the present invention.
Figure 2A:
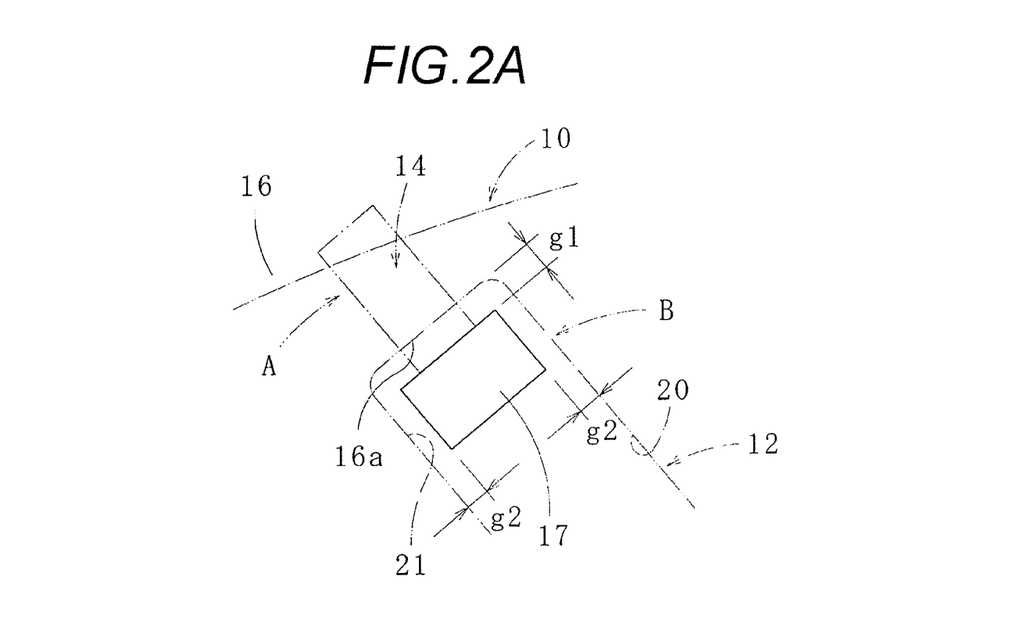
FIGS. 2A and 2B are plan views indicating a part of the production method of the rotor laminated core, respectively.
Figure 2B:
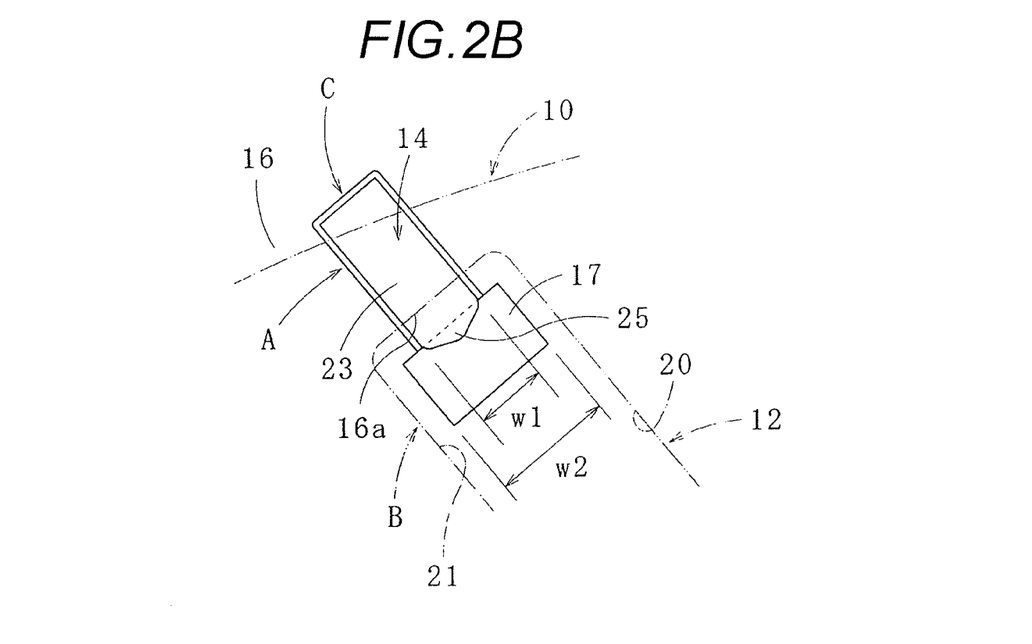

A belt-shaped board 16 which is constituted by a magnetic steel board is prepared to blank out the core pieces 10. A first blanking area is decided in the belt-shaped board 16 to define the shape of the core piece 10. In the belt-shaped board 16, core pieces (rotor core pieces) 10 which constitute the rotor laminated core 13 are formed at predetermined pitch. In a center of the core piece 10, the axial bore 15 is formed, as shown in FIG. 1 beforehand or after. As shown in FIGS. 2A and 2B, there exist blanking areas B (second blanking area) for a plurality of magnet-insertion holes and areas A where leakage magnetic flux passes from the permanent magnets 11 inserted in the magnet-insertion holes 12. In other words, the second blanking area defines a shape of the magnet-insertion hole 12.

Then, as shown in FIG. 2A, a temporary aperture 17 is formed beforehand in the blanking area B for the magnet-insertion holes while providing a gap g1 from a side-end part 16a in a radial direction of the blanking area B. Here, the temporary aperture 17 exists on an extension line of the central axis of thinning part 14, and it is formed of a generally rectangular shape in a plan view. The temporary aperture 17 is formed while providing a constant gap g2 from each edge part 20, 21 of the magnet-insertion hole 12 in the widthwise direction. Here, the gap g1 ranges between 0.05 to 0.5 mm, for example. The gap g2 may exceed 0.5 mm, but the width of the thinning part gets narrow. Where the gaps g1, g2 are formed less than 0.05 mm, it is like that the thinning part 14 transforms and a blanking residue is produced from the press-worked edge region 20, 21 when the magnet-insertion holes 12 are blanked.

In this state, as shown in FIG. 2B, coining process is performed on the area A through which the leakage flux from the permanent magnet 11 passes. Thereby, as shown in FIG. 2B, the groove-shaped thinning part 14 which crosses the leakage flux which passes through the area A is formed in a surface of the core piece 10. The thinning part 14 has, in its circumference, an inclined surface 24, the inclined angle of which is 30 to 60 degrees, for example, as shown in FIG. 3B. The groove bottom 23 of the thinning part 14 is planar, and its thickness t1 is around 0.3 to 0.98 times larger than the board thickness t of the core piece 10, for example.

An inner end (one end) of thinning part 14 exists in the temporary aperture 17, and the width W1 of the groove bottom 23 of the thinning part 14 is smaller than the width W2 of the temporary aperture 17. For example, the width W1=(0.5 to 0.8)×the width W2. In this embodiment, the center axis of the thinning part 14 and center line of the temporary aperture 17 are coincident with each other. In this situation, some metal piece of the core piece 10 caused by a coining process scatters around the thinning part 14, and the bulge (metal piece) 25 is also formed within the temporary aperture 17. In this embodiment, another end of the thinning part 14 exists in the outer area (i.e., a spatial area C, or a third blanking area) than an external form of the belt-shaped board 16 or core piece 10.

Figure 3A:
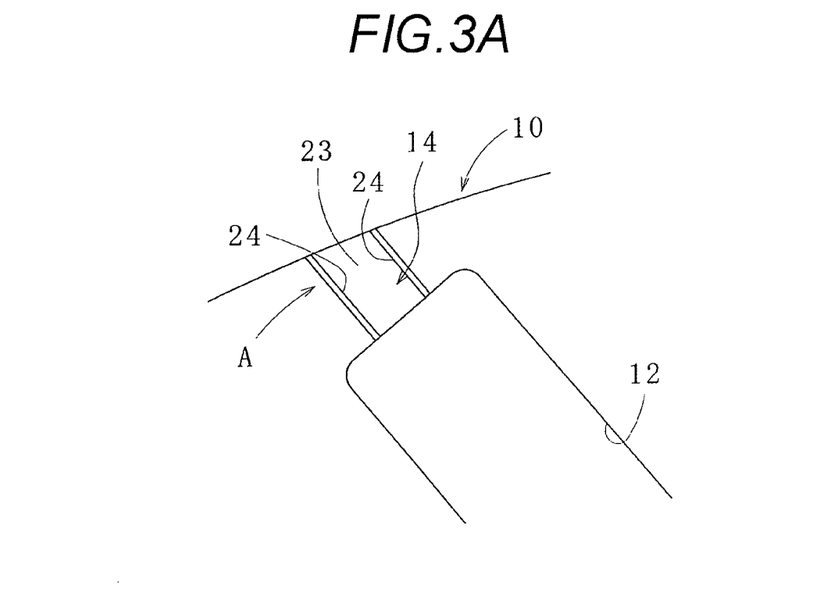
FIG. 3A is a plan view indicating a part of the production method of the rotor laminated core.
Figure 3B:
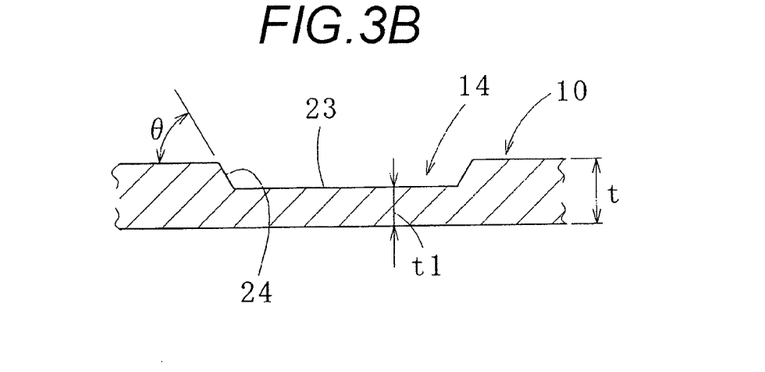
FIG. 3B is a sectional view of a thinning part.

Then, as shown in FIG. 3A, the magnet-insertion hole 12 that completely surrounds the temporary aperture 17 and an external form of the core piece 10 are blanked sequentially or at the same time. In this process, the temporary aperture 17 disappears, and the bulge 25 in the temporary aperture 17 also disappears. Thereby, the magnet-insertion hole 12 is accurately formed in shape.

Because the shape of the thinning part 14 does not change, the strength of the thinning part increases by coining process, and, besides, the reluctance increases, and leakage magnetic flux decreases. In this embodiment, an outer region of the core piece 10 forms the spatial area C or the third blanking area. If the outer area of the thinning part 14 is an outer area of the core piece 10, it is not necessary to provide a temporary aperture in the outer area of thinning part 14. In this case, the outer area of the core piece 10 may transform to some extent, but there is not a trouble particularly because external form is finally blanked.

Figure 4:
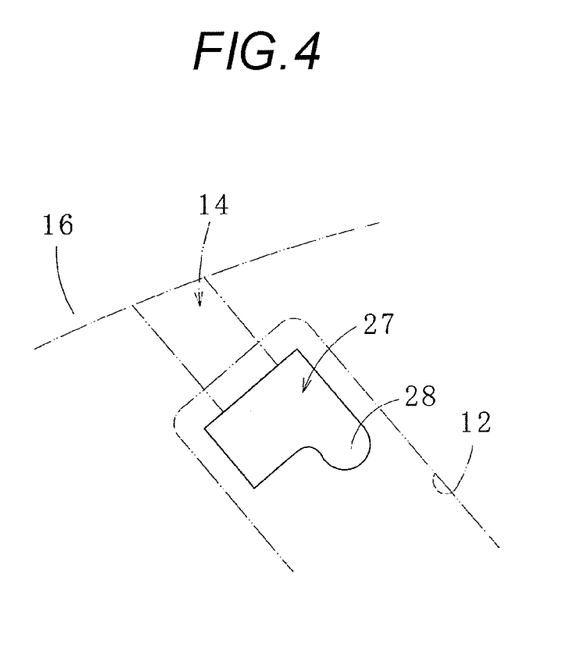
FIG. 4 is an illustration of a production method of the rotor laminated core according to a second embodiment of the present invention.

Subsequently, a production method of a rotor laminated core according to a second embodiment of the present invention is described with reference to FIG. 4, while describing the point that is different from the production method of the rotor laminated core according to the first embodiment. The same applies to the following embodiments.

In this embodiment, a temporary aperture 27 includes a base part (in substantially rectangular shape in this embodiment) and an expanded part 28 (outline length increasing area) that extends or increases the entire circumstance of the temporary aperture 27. If the temporary aperture 27 has an simple outline such as a rectangle, when the temporary aperture 27 is blanked in a die by a punch, it is likely possible that the blanked piece is suctioned at the bottom of the punch by a vacuum power, and the blanked piece is raised. In this embodiment, however, since the expanded part 28 is provided, a contact resistance between the blanked piece and the die increase and the blanked piece is just remained in the die, thereby preventing the rise of the blanked piece in accordance with the raise of the punch. Furthermore, because the cross sectional area of the blade increases due to the existence of the expanded part 28, the life of the blade can be lengthened.

Figure 5:
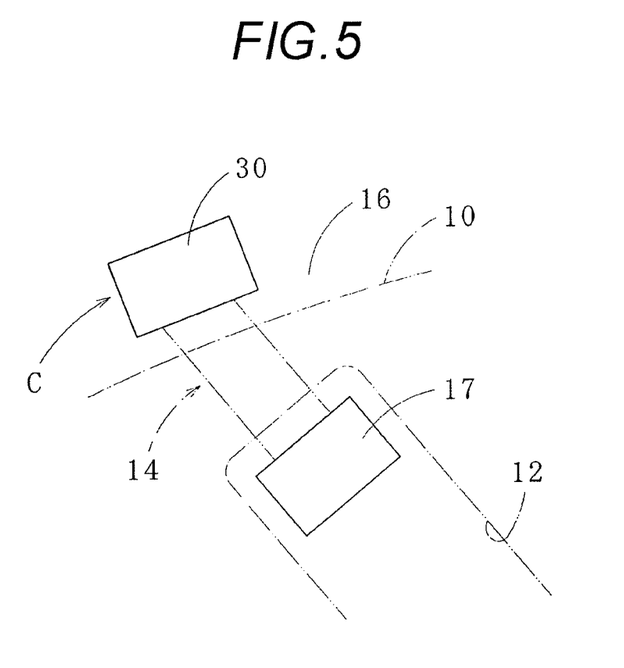
FIG. 5 is an illustration of a production method of the rotor laminated core according to a third embodiment of the present invention.

Subsequently, a production method of a rotor laminated core according to a third embodiment of the present invention is described with reference to FIG. 5. In this embodiment, a temporary aperture 30 is formed in the belt-shaped board 16 except for the area of the core piece 10. The temporary aperture 30 exists on extension of the groove-shaped thinning part 14. A bulge is generated in each of the temporary aperture 30, 17 by a coining of the thinning part 14, but the temporary apertures 17, 30 are blanked and dropped by blanking process of the magnet-insertion hole 12 and the blanking process of external form of the core piece 10, and a precise external form of the core piece 10 and a precise outline of the magnet-insertion hole 12 are formed.

Figure 6:
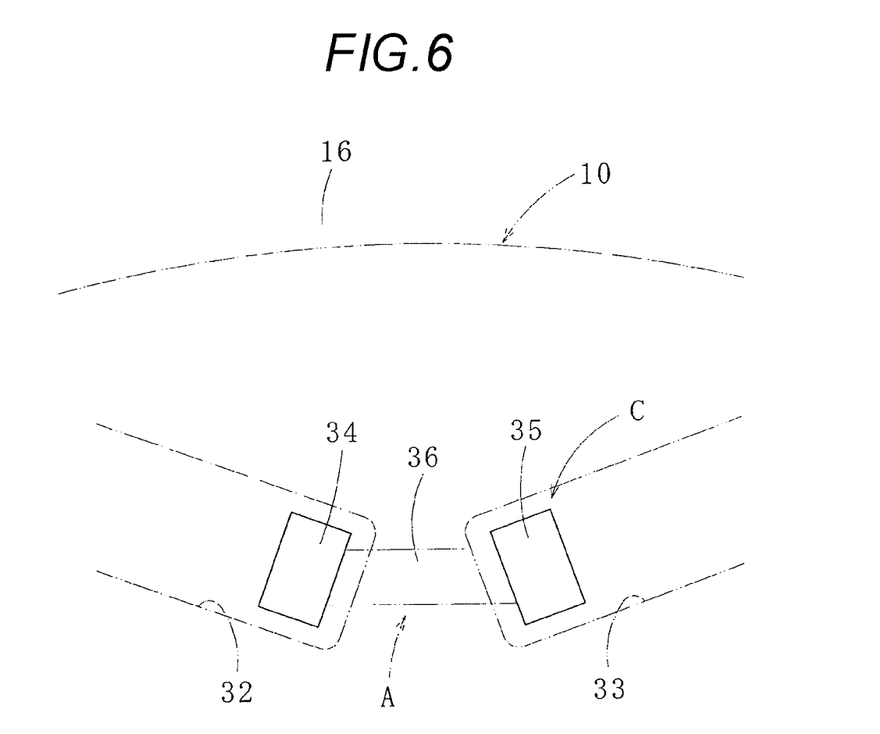
FIG. 6 is an illustration of a production method of the rotor laminated core according to a fourth embodiment of the present invention.

Subsequently, a production method of a rotor laminated core according to a fourth embodiment of the present invention is described with reference to FIG. 6.

In this embodiment, an area A through which the leakage flux passes from permanent magnets exists between adjacent magnet-insertion holes 32, 33. As such, temporary apertures 34, 35 are formed in adjacent edge parts of the magnet-insertion holes 32, 33, respectively, and a groove-shaped thinning part 36 is formed to interconnect the temporary apertures 34, 35 together. The cross-section of the thinning part 36 is the same as that of the thinning part 14 in the first embodiment.

According to this structure, hardening process is performed in the area A to be reinforced, and reluctance to the leakage flux becomes large, and as a result, leakage flux decreases. In addition, since the shape of the magnet-insertion holes 32, 33 is maintained in a predetermined shape, the insertion position of the permanent magnet becomes more correct.

In this embodiment, the magnet-insertion hole 32 corresponds to a basic magnet-insertion hole, and a blanking area for the other magnet-insertion hole 33 constitutes the spatial area C.

Subsequently, a production method of a rotor laminated core according to a fifth embodiment of the present invention is described with reference to FIG. 7.

Figure 7:
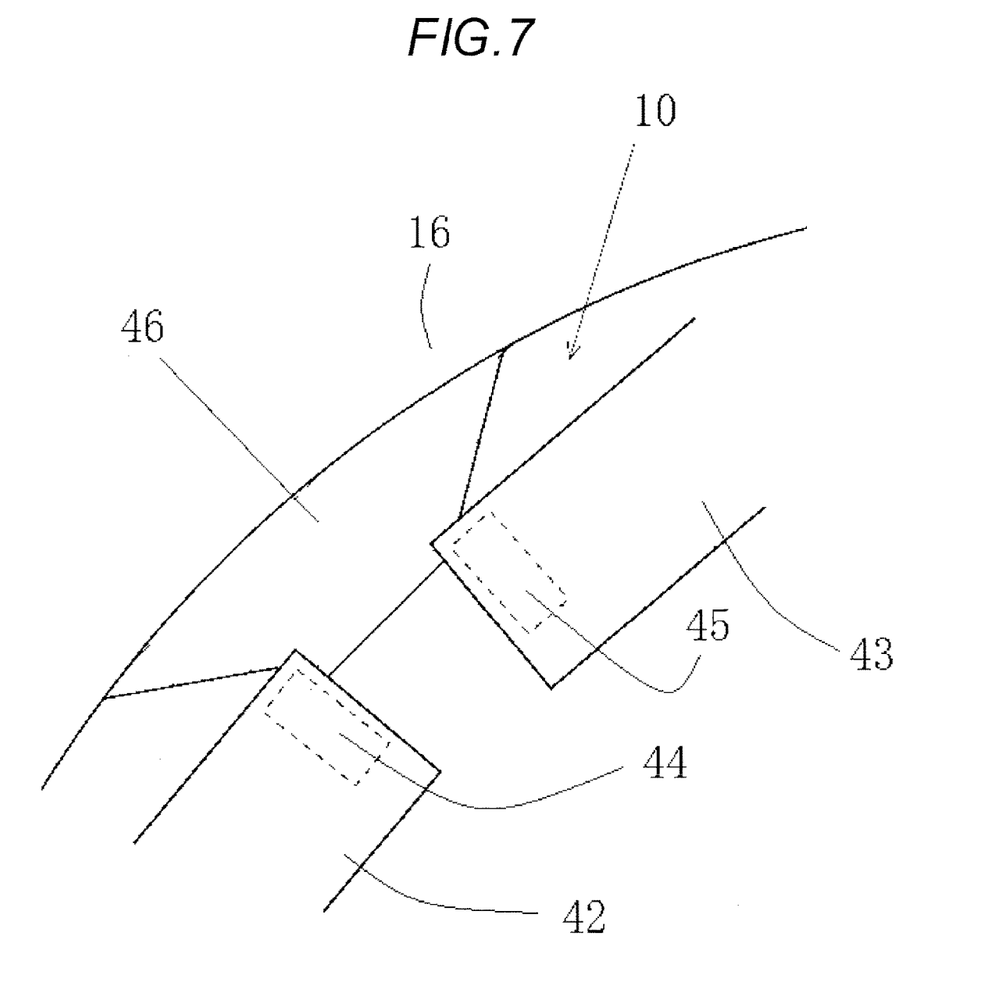
FIG. 7 is an illustration of a production method of the rotor laminated core according to a fifth embodiment of the present invention.

In this embodiment, temporary apertures 44, 45 are formed in adjacent edge parts of magnet-insertion holes 42, 43 respectively, and a thinning part 46 is formed in a predetermined area between the temporary apertures 44, 45 and the outline of the core piece 10, as shown in FIG. 7. Namely, the thinning part 46 does not necessarily have a straight groove-shape as previously described in the other embodiments, but may have an arbitrary area extending from two magnet-insertion holes 44, 45 and other blanking area such as an outline of the core piece 10.

The present invention is not limited to detailed description of the embodiments and the construction can be changed as far as the subject matter of the present invention is not changed.

For example, the present invention is applied to the production method of the rotor laminated core which includes a new step in which some steps of the production method of the rotor laminated core according to the first embodiment of the present invention and the production method of the rotor laminated core according to other embodiment are combined together. For example, the expanded part according to the second embodiment can be applied to the configuration of other embodiment.

Also, the formation area of an aperture for reduction in weight that is provided in the rotor laminated core can be assumed a spatial area C or a third blanking area. The spatial area C or the third blanking area is decided to define a shape of an arbitrary part in the magnetic steel board.

What is claimed is:
1. A method for producing a rotor laminated core by laminating circular core pieces, the method comprising:
preparing a magnetic steel board from which each of the circular core pieces is blanked;
determining a first blanking area, a second blanking area and a third blanking area in the magnetic steel board, wherein the first blanking area defines a shape of each core piece in the magnetic steel board, the second blanking area defines a shape of a magnet-insertion hole to be formed in each core piece to insert a permanent magnet therein, and the third blanking area defines a shape of an arbitrary part in the magnetic steel board;

forming a temporary aperture in the second blanking area;

forming a thinning part which extends at least from the temporary aperture to the third blanking area; and blanking the first blanking area, the second blanking area together with the temporary aperture and the third blanking area, thereby producing each circular core piece including the thinning part and a plurality of magnet-insertion holes which are formed in a circumferential direction;

wherein by blanking the second blanking area, the temporary aperture disappears and a bulge in the temporary aperture generated by forming the thinning part disappears.

2. The method according to claim 1, wherein
the temporary aperture is formed with a gap from a boundary of the second blanking area, and
the thinning part is formed in a groove-shape which extends from the temporary aperture to the third blanking area, and the thinning part crosses an area in the core piece through which a leakage flux is passed from the permanent magnet.

3. The method according to claim 2, wherein
the temporary aperture is provided on an extension of the groove-shaped thinning part, and the temporary aperture is larger in width than the groove-shaped thinning part.

4. The method according to claim 1, wherein
the temporary aperture is formed separate by an amount of 0.05 to 0.5 mm from a boundary of the second blanking area which contacts the thinning part.

5. The method according to claim 1, wherein
the temporary aperture includes a first part which is continuous to the thinning part and an expanded part having a width smaller than that of the first part to extend an entire circumference of the temporary aperture.

6. The method according to claim 1, wherein
the third blanking area is an area outside the first blanking area, another blanking area which defines a shape of another magnet-insertion hole in the core piece, or still another blanking area which defines a shape of an aperture for reduction in weight of the core piece.

7. The method according to claim 1, wherein
a thickness of the thinning part is in a range of 0.3 to 0.98 times of a board thickness of the core piece.

8. A method for producing a rotor laminated core by laminating circular core pieces, the method comprising:
preparing a magnetic steel board from which each of the circular core pieces is blanked;
determining a first blanking area, a second blanking area and a third blanking area in the magnetic steel board, wherein the first blanking area defines a shape of each core piece in the magnetic steel board, the second blanking area defines a shape of a magnet-insertion hole to be formed in each core piece to insert a permanent magnet therein, and the third blanking area defines a shape of an arbitrary part in the magnetic steel board;

forming a temporary aperture in the second blanking area;

forming a thinning part which extends at least from the temporary aperture to the third blanking area; and blanking the first blanking area, the second blanking area together with the temporary aperture and the third blanking area, thereby producing each circular core piece including the thinning part and a plurality of magnet-insertion holes which are formed in a circumferential direction, wherein the temporary aperture is formed with a gap from a boundary of the second blanking area, and
the thinning part is formed in a groove-shape which extends from the temporary aperture to the third blanking area, and the thinning part crosses an area in the core piece through which a leakage flux is passed from the permanent magnet.

9. The method according to claim 8, wherein
the temporary aperture is provided on an extension of the groove-shaped thinning part, and the temporary aperture is larger in width than the groove-shaped thinning part.

10. A method for producing a rotor laminated core by laminating circular core pieces, the method comprising:
preparing a magnetic steel board from which each of the circular core pieces is blanked;
determining a first blanking area, a second blanking area and a third blanking area in the magnetic steel board, wherein the first blanking area defines a shape of each core piece in the magnetic steel board, the second blanking area defines a shape of a magnet-insertion hole to be formed in each core piece to insert a permanent magnet therein, and the third blanking area defines a shape of an arbitrary part in the magnetic steel board;

forming a temporary aperture in the second blanking area;

forming a thinning part which extends at least from the temporary aperture to the third blanking area; and blanking the first blanking area, the second blanking area together with the temporary aperture and the third blanking area, thereby producing each circular core piece including the thinning part and a plurality of magnet-insertion holes which are formed in a circumferential direction, wherein the temporary aperture is formed separate by an amount of 0.05 to 0.5 mm from a boundary of the second blanking area which contacts the thinning part.

* * * * *